April 5, 1927.
O. LAMBERT
COP WINDING FRAME
Filed Aug. 19, 1926
1,623,191
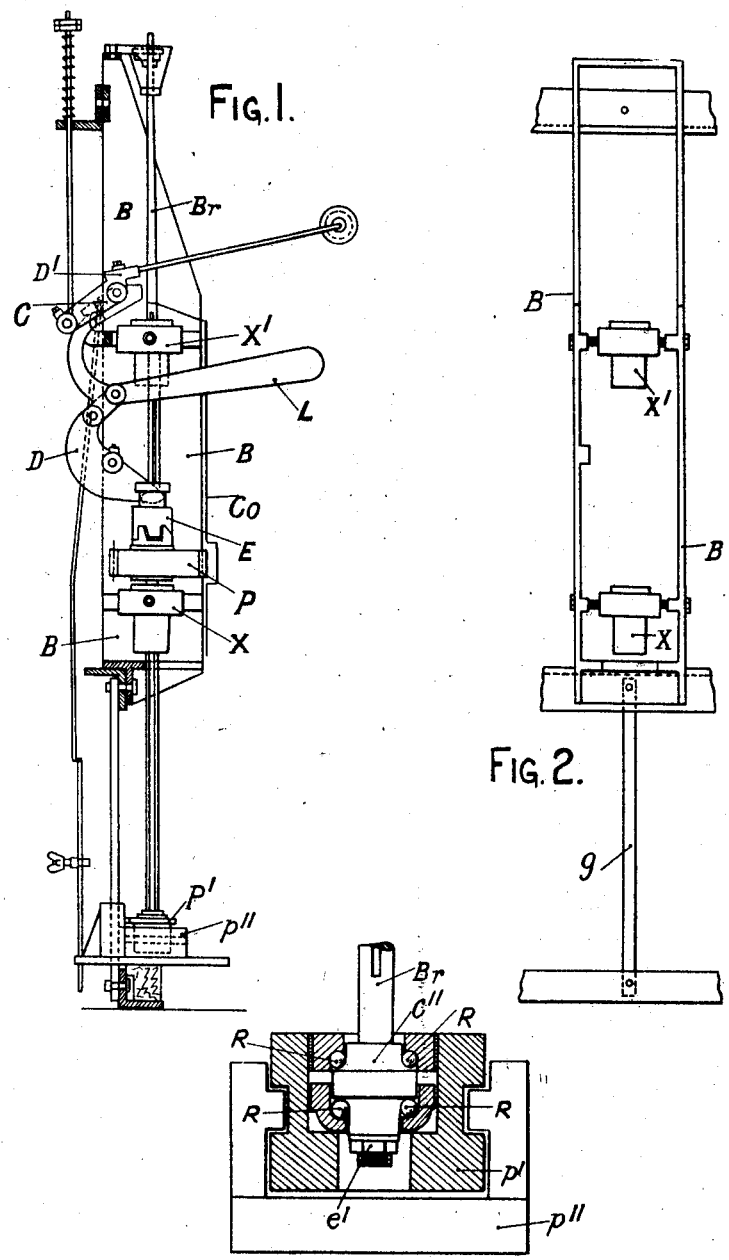

Patented Apr. 5, 1927.

1,623,191

UNITED STATES PATENT OFFICE.

OSWALD LAMBERT, OF TAMISE, BELGIUM.

COP-WINDING FRAME.

Application filed August 19, 1926, Serial No. 130,316, and in Belgium October 30, 1925.

This invention relates to cop-winding frames as used in the manufacture of jute, flax or hemp yarn, or the like, and has for its object to provide in such a frame a fitting individual to each spindle for housing and supporting the working and driving parts of the spindle.

The fitting in question embodies a box unit individual to a spindle, carrying within its interior spindle bearings in aligned relation as well as supportng the fulcra of operating levers. The use of such a fitting renders possible accurate assembly of the parts and accurate fitting of replacement parts and permits of simplification of the upkeep of the transmission elements.

For transmission it is preferred to employ helical gearing and thus to ensure silent running as well as efficiency.

In the accompanying drawing Fig. 1 is a part elevation part vertical section of the complete fitting with clutch device.

Fig. 2 is an elevation at right angles to Fig. 1, the working parts being removed.

Fig. 3 is a detail view in section showing a ball thrust socket in which the spindle revolves.

Referring to the drawings, X denotes a lower spindle bearing and $X^1$ an upper spindle bearing in which revolves the spindle $B^r$ adapted to be coupled to the driven helical pinion P by operation of a clutch E controlled by an operating lever L which acts through the element D. $D^1$ denotes the clutch release and C the usual catch. The upper part of the spindle, the bearings X, $X^1$ and the pinion are enclosed in a box B to which is applied a cover $C^o$. At its lower end the spindle $B^r$ carries a cone $C''$ sustained by the balls R of ball bearings and retained by a clamping nut $e^1$, the ball bearings being accommodated in a socket $P^1$ beneath which is the pedal $P''$ guided by the pedal guide $g$.

What I claim is:—

In a cop-winding frame, in combination with a spindle, a box unit individual to said spindle partly enclosing said spindle, spindle bearing members carried by and within said box unit, a pinion on said spindle housed in said box unit, a clutch on said spindle, within said box unit, for coupling said pinion with said spindle, and clutch controlling means sustained by said box unit.

In testimony whereof I have signed my name to this specification.

OSWALD LAMBERT.